Figure 1:
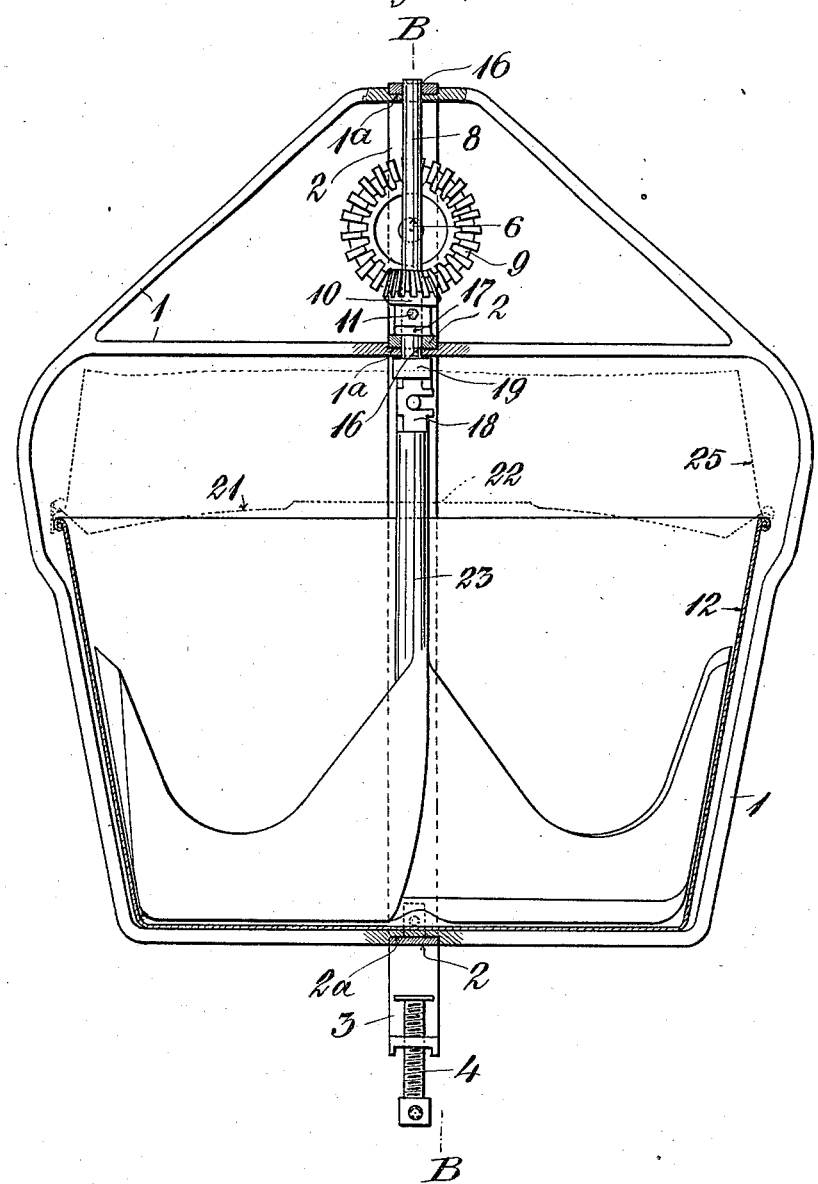

R. KISIĆ.
CULINARY MACHINE.
APPLICATION FILED MAY 1, 1911.

1,045,039.

Patented Nov. 19, 1912.
2 SHEETS—SHEET 1.

Witnesses:
W. K. Boulter
A. L. Cook.

Inventor:
Risto Kisić
by Wm. E. Boulter
his Attorney.

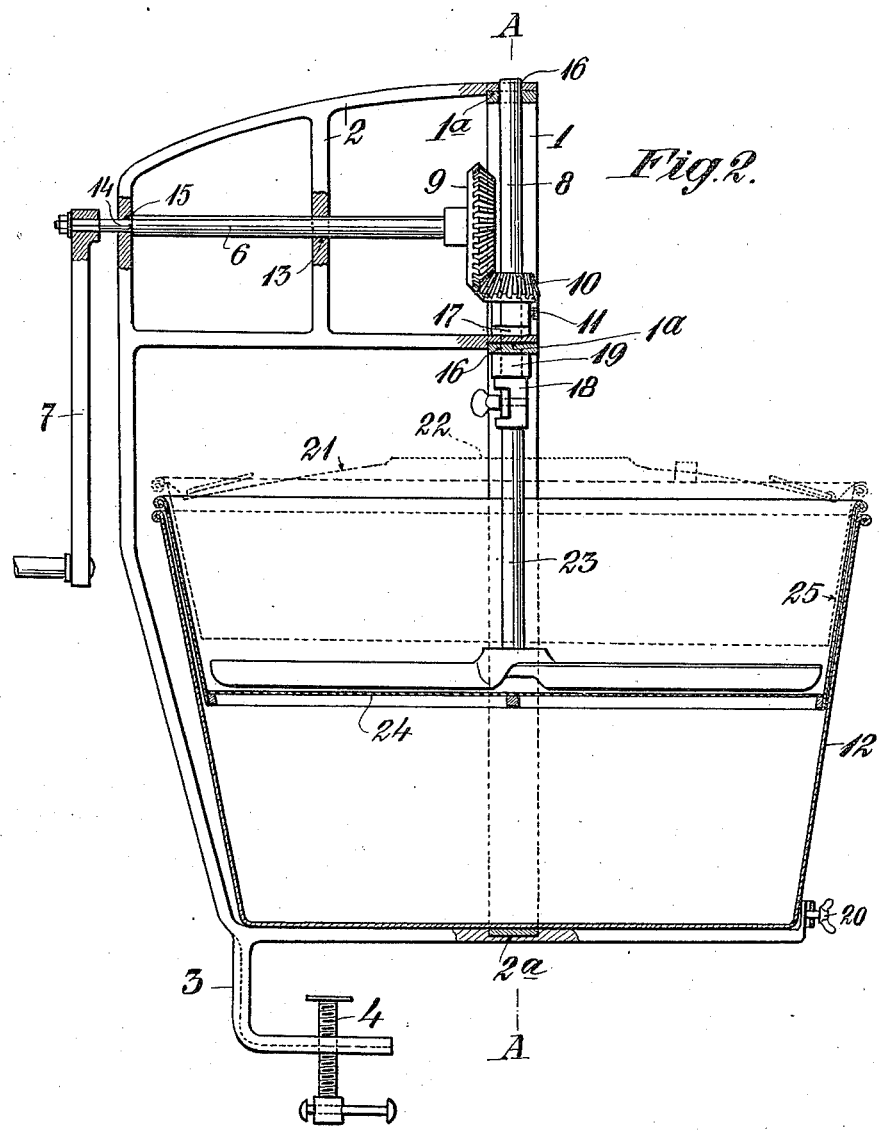

UNITED STATES PATENT OFFICE.

RISTO KISIĆ, OF MOSTAR, AUSTRIA-HUNGARY.

CULINARY MACHINE.

1,045,039.  Specification of Letters Patent.  Patented Nov. 19, 1912.

Application filed May 1, 1911. Serial No. 624,522.

*To all whom it may concern:*

Be it known that I, RISTO KISIĆ, a subject of the Emperor of Austria-Hungary, residing at Mostar, in Austria-Hungary, have invented certain new and useful Improvements in Culinary Machines, of which the following is a full, clear, and exact description.

This invention relates to a machine intended for domestic or culinary purposes, which machine while utilizing one and the same frame and one and the same actuating means can be used for various purposes such as the kneading of dough for bread and confectionery, the sifting of meal, sugar and like pulverulent materials, the extraction of fruit juices, the separation of butter from milk, or of honey from the comb, and for mixing together fruit juices and other liquids, beating up the whites and yolks of eggs, etc., and the production of fruit ices and the like in a simpler, quicker and more thorough manner than by hand.

The invention is differentiated from known means used for the actuation of different appliances by means of a comman actuating device with which the appliance required at the moment can be connected by this feature, that the frame serving to support the driving mechanism and to retain the appliance being used consists of two parts which are connected solely by the spindles of the driving gear so that the frame can be easily taken apart and the whole machine made to occupy a small space.

In the accompanying drawing: Figure 1 is a vertical section of the machine taken in a plane at right angles to the driving shaft, showing the machine in use for kneading dough. Fig. 2 is a vertical section on a central plane passing through the driving shaft and shows the machine in use for sifting pulverulent materials or for expressing fruit juices.

The machine comprises a main frame 1 and the auxiliary frame 2, which latter is arranged at right angles to the former, and is provided with a clamp 3 having a clamping screw 4 for detachably securing the frame 2 to a table or the like.

In the auxiliary frame 2 is mounted the driving shaft 6 which can be rotated by a crank 7. The two frames 1 and 2 are held together solely by means of a shaft 8 which is driven by means of a beveled pinion 9 mounted on the driving shaft 6 through the medium of gear 10. The gear 10 is held on the shaft 8 by means of a clamping screw 11 so that on loosening said screw, the shaft 8 can be removed from below. The ends of the arms of the auxiliary frame 2 engage in corresponding recessed portions of the main frame 1 whereby movement of the two parts 1 and 2 relatively to each other about the common axis is prevented.

The shaft 8 engages in bearings 16 in register provided in overlapping portions of the frame members, whereby lateral separation of the frames is prevented. The shaft 8 is prevented from falling out by the gear 10 secured thereto, said gear being supported on a collar 17, while movement of the shaft 8 in an upward direction is prevented by the engagement of the pinion 9 with the gear 10. The driving shaft 6 is prevented from moving in an axial direction by a shoulder 14. Thus, no securing devices of any kind are used for the connection of the two frames 1 and 2.

The lower end of the shaft 8 carries one part of a coupling member 18, the other part of which is located on the appliance to be connected therewith or on the spindle thereof. Beneath the lower bearing 16 is secured on the shaft 8 a ring 19 of absorbent material, as felt, which prevents the lubricant supplied to the bearing 16 from dropping on to the appliance beneath the same.

To the machine is attached a vessel 12 which is supported from beneath by the lower portions of the frames 1 and 2 and is prevented from rotating by a clamping device 20.

The appliance used depends on the work required at the moment by the machine; each appliance is preferably made to serve several purposes.

In Fig. 1 of the drawing in which the machine is arranged for kneading dough, a kneading appliance is secured to the shaft 8 which appliance consists of two or more kneading members 22 carried by a common spindle 23. The machine is also supplied with a cover 21 (seen in dotted lines in Figs. 1 and 2) having a central opening 22 through which the spindle 23 of the appliance passes and said cover prevents portions of the material being thrown out of the vessel when in operation.

The vessel 12 can also be used to permit the fermentation of the dough worked therein and for this purpose is provided with a trough-shaped pan 25 adapted to serve as a cover which is placed in inverted position over the vessel 12 as seen in dotted lines in Fig. 1. The pan 25 can also be used as a baking pan.

When it is desired to use the machine for sifting purposes or for expressing fruit juices, as seen in Fig. 2, the pan 25 is placed in vessel 12 and a removable sieve 24 placed in pan 25 for the purpose of sifting pulverulent materials or for expressing fruit juices.

Owing to the fact that the shaft 8 is retained in its position solely by the beveled pinion 10 and is adjustable in this position, it is possible to have the appliance acting at different heights which is particularly advantageous in working dough as also in sifting or expressing dry or liquid materials.

Both the sieve 24 and pan 25 fit within vessel 12 so as to occupy but little space; by loosening the adjusting screw 11 the shaft 8 can be taken out from below and the frames taken apart so that these also will occupy but a small space.

What I claim is:

1. In a machine of the character described, the combination with a main frame and an auxiliary frame, of a vertically-arranged shaft having bearings in both of said frames and forming a connection therefor and adapted to support a tool or implement to be operated by said shaft.

2. In a machine of the character described, the combination with a main frame and an auxiliary frame, said frames having overlapping portions provided with registering bearing openings, of a shaft mounted in said openings and forming a connection for the frames and adapted to support a tool or implement to be operated by said shaft.

3. In a machine of the character described, the combination with a main frame and an auxiliary frame having overlapping portions provided with bearing openings, of a vertically-arranged shaft mounted in said openings and adapted to support a tool or implement to be operated by said shaft, a bevel pinion on said shaft, a horizontally-arranged shaft mounted in the auxiliary frame, and a bevel pinion on the latter shaft gearing with the first-mentioned pinion.

4. In a machine of the character described, the combination with a main frame and an auxiliary frame having overlapping portions provided with registering bearing openings, of a vertically-arranged shaft mounted in said openings and adapted to support a tool or implement to be operated by said shaft, a bevel pinion removably mounted on said shaft, a horizontally-arranged shaft mounted in the auxiliary frame, and a bevel pinion on the latter shaft gearing with the first-mentioned pinion.

Signed at Vienna in the Province of Lower Austria and State of Austria-Hungary this eleventh day of April A. D. 1911.

RISTO KISIĆ.

Witnesses:
WILHELM BERGER,
AUGUST FUGGER.

Copies of this patent may be obtained for five cents each, by addressing the "Commissioner of Patents, Washington, D. C."